United States Patent [19]

Blaschek

[11] Patent Number: 4,515,469
[45] Date of Patent: May 7, 1985

[54] MOTION PICTURE CAMERA HAVING AN INTERCHANGEABLE LENS

[75] Inventor: Otto Blaschek, Aschheim, Fed. Rep. of Germany

[73] Assignee: Arnold & Richter Cine Technik GmbH. & Co. Betriebs KG, Munich, Fed. Rep. of Germany

[21] Appl. No.: 316,689

[22] Filed: Oct. 30, 1981

[30] Foreign Application Priority Data

Oct. 31, 1980 [DE] Fed. Rep. of Germany ....... 3041161

[51] Int. Cl.³ .................. G03B 27/72; G03B 27/76
[52] U.S. Cl. .................................................. 355/35
[58] Field of Search ......................................... 352/35

[56] References Cited

U.S. PATENT DOCUMENTS

| 1,667,724 | 5/1928 | DeVry ............................ 352/35 |
| 3,331,653 | 7/1967 | Blaschek et al. ............... 352/35 |
| 4,013,352 | 3/1977 | Monroy .......................... 352/35 |
| 4,121,886 | 10/1978 | Gottschalk .................... 352/35 |

*Primary Examiner*—Monroe H. Hayes
*Attorney, Agent, or Firm*—Fleit, Jacobson, Cohn & Price

[57] ABSTRACT

This invention relates to a motion picture camera in which an interchangeable lens is connected by a lens adapter to the camera mechanism including the film guide with film gate and the camera mechanism is suspended from the camera housing and/or is designed so as to prevent a transmission of structure-borne noise. To ensure that the sound that can be transmitted to the outside by the lens will be substantially attenuated, the lens adapter comprises a lens mount member and a flange, which is connected to the camera mechanism and is connected to the lens mount member by means which are adapted to absorb structure-borne noise.

2 Claims, 1 Drawing Figure

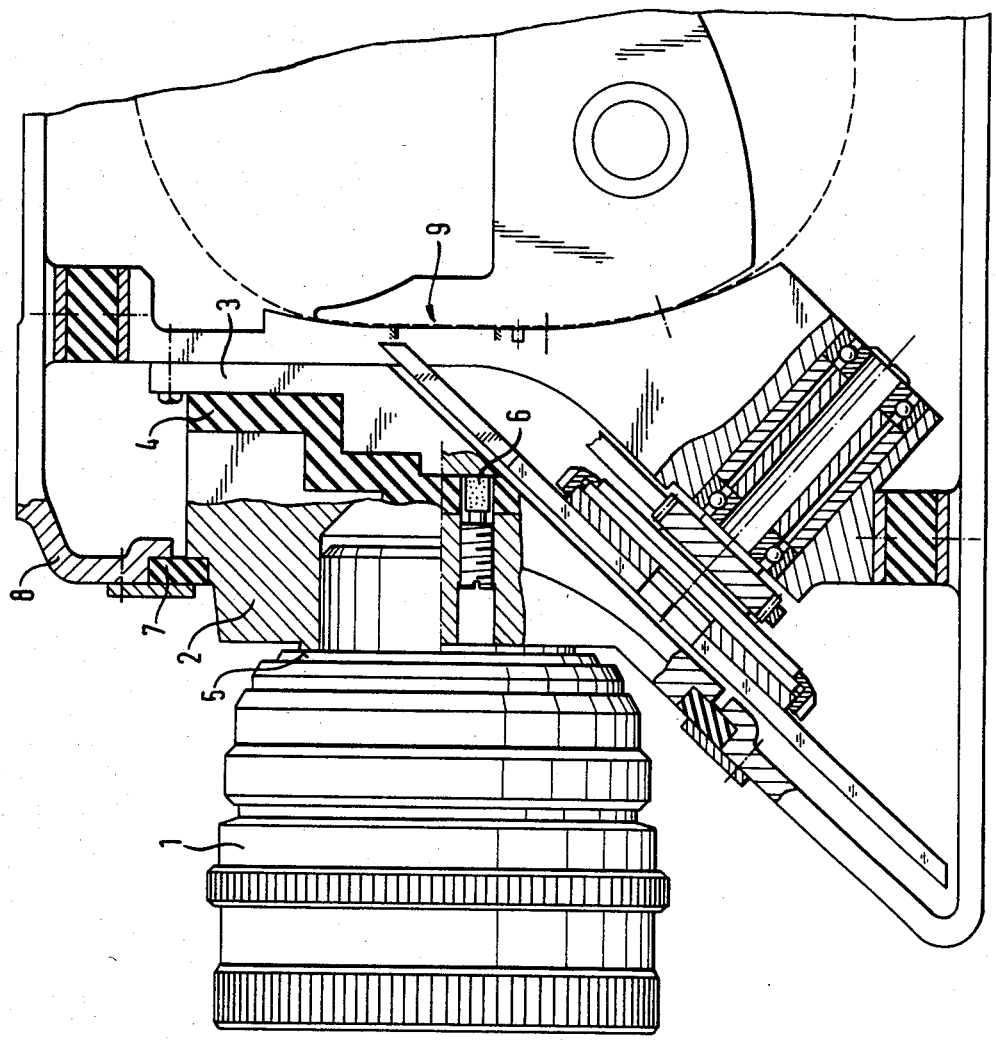

MOTION PICTURE CAMERA HAVING AN INTERCHANGEABLE LENS

This invention relates to a motion picture camera in which an interchangeable lens is connected by a lens adapter to the camera mechanism including the film guide with film gate and the camera mechanism is suspended from the camera housing and/or is designed so as to prevent a transmission of structure-borne noise.

In such motion picture camera disclosed in German Patent Specification No. 1,236,329, a lens blimp is used to attenuate the sound which is generated by the camera mechanism and transmitted to the outside by the lens. The manufacture of that lens blimp is expensive and its use renders the control and the interchange of the lens more difficult.

It is an object of the invention to provide a motion picture camera which is of the kind described first hereinbefore and in which the sound that can be transmitted to the outside by the lens is substantially attenuated.

This object is accomplished in accordance with the invention in that the lens adapter comprises a lens mount member and a flange, which is connected to the camera mechanism and is connected to the lens mount member by means which are adapted to absorb structure-borne noise.

The advantage afforded by the invention resides in that the noise generated by the camera mechanism and audible on the outside is so small that there is no need to use a lens blimp.

According to a preferred further feature of the invention, a constant distance is mechanically maintained between the lens-supporting plane of the lens mount member and the film gate by the provision of one or more stops, which is or are held under initial stress and capable of absorbing structure-borne noise. The stop or stops is or are preferably adjustable. According to a further preferred feature, the lens mount member and the flange connected to the camera mechanism are bonded to each other by vulcanization. The flange connected to the camera mechanism may constitute a portion of the baseplate of the camera mechanism.

The invention will now be explained more fully with reference to an illustrative embodiment shown on the drawing.

The lens adapter shown in the single FIGURE of the drawing consists of two members, namely, the lens mount member 2 and the flange 3, which is connected to the camera mechanism. The lens 1 is adapted to be inserted into the lens mount member 2 and to be locked by suitable means, such as a bayonet joint. The lens mount member 2 is fitted by means of a rubber seal 7 in an opening of the camera housing 8. The flange 3 is firmly connected to the baseplate which carries the elements of the camera mechanism as well as the film guide with the film gate 9. The two parts are joined by a vulcanized layer 4, which consists of a material that is adapted to absorb structure-born noise. A constant distance between these two parts and, as a result, between the lens-supporting plane 5 of the lens mount member 2 and the film gate 9 is mechanically maintained by means of adjustable stops 6, which are adapted to absorb structure-borne noise and held under initial stress. The initial stress ensures that the distance will remain constant regardless of the orientation of the camera and within a temperature range from +50° C. to −25° C. This will ensure a uniform picture quality. Experiments have shown that the use of stops gives much better results than the connection of the two parts by screw-threaded joints to a material capable of absorbing structure-borne noise.

In an embodiment that is not shown, the flange 3 itself is a part of the baseplate of the camera mechanism.

I claim:

1. A motion picture camera comprising:

a camera housing;

a camera mechanism including a film gate, said camera mechanism being suspended from said camera housing for preventing a transmission of structure-borne noise from said camera mechanism to said camera housing;

a lens adapter including a lens mount member and a flange, said flange being fixed to said camera mechanism;

an opening defined by said camera housing, said lens mount member being mounted in said opening and adapted to hold an interchangeable lens;

resilient mounting means for mounting said lens mount member in said opening;

a lens supporting plane defined by said lens mount member;

noise absorbing means interposed between said lens mount member and said flange for absorbing structure-borne noise generated by said camera mechanism; and at least one adjustable stop mounted in said lens mount member and engaging said flange for maintaining a constant distance between said lens supporting plane and said film gate and for absorbing structure-borne noise generated by said camera mechanism.

2. A motion picture camera as claimed in claim 1, wherein said lens mount member and said flange connected to the camera mechanism are bonded to each other by vulcanization.

* * * * *